(12) United States Patent
West et al.

(10) Patent No.: US 8,406,712 B2
(45) Date of Patent: Mar. 26, 2013

(54) EXTENDED RANGE VOICE OVER IP WIMAX DEVICE

(75) Inventors: Barry John West, Alexandria, VA (US); Herkole Sava, Reston, VA (US); Ali Reza Tabassi, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1001 days.

(21) Appl. No.: 12/432,643

(22) Filed: Apr. 29, 2009

(65) Prior Publication Data

US 2010/0278100 A1 Nov. 4, 2010

(51) Int. Cl.
*H04B 1/04* (2006.01)
*H04B 7/00* (2006.01)

(52) U.S. Cl. ..................... 455/127.1; 455/522

(58) Field of Classification Search .................. 455/126, 455/127.1, 127.2, 127.3, 522
See application file for complete search history.

(56) References Cited

U.S. PATENT DOCUMENTS

| | | | |
|---|---|---|---|
| 6,812,271 B2 * | 11/2004 | Swartz et al. | 524/430 |
| 7,826,809 B2 * | 11/2010 | Hwang et al. | 455/127.1 |
| 7,949,315 B2 * | 5/2011 | Rofougaran | 455/127.1 |
| 7,978,621 B2 * | 7/2011 | Rofougaran | 370/252 |
| 8,107,895 B2 * | 1/2012 | Rofougaran | 455/91 |
| 2002/0168993 A1 | 11/2002 | Choi et al. | |
| 2003/0022686 A1 | 1/2003 | Soomro et al. | |
| 2003/0189906 A1 | 10/2003 | Belcea | |
| 2005/0143027 A1 * | 6/2005 | Hiddink et al. | 455/127.1 |
| 2006/0223567 A1 | 10/2006 | Kwak et al. | |

* cited by examiner

*Primary Examiner* — Blane J Jackson
(74) *Attorney, Agent, or Firm* — Davis Wright Tremaine LLP; Michael J. Donohue; Heather M. Colburn

(57) ABSTRACT

A method implemented in a mobile station ("MS"). When the MS transmits, it generates radio frequency ("RF") energy. To limit exposure to RF energy, regulatory agencies determined a maximum transmission power for mobile stations. The amount of RF energy considered safe is that generated when the MS is transmitting continuously at the maximum transmission power for a predetermined period. The method first determines whether the maximum transmission power is too low to effect communication between the MS and a base station. If it is, the transmission power is increased and if possible, the data transmission rate of outbound data is reduced to at or below a data rate threshold that reduces the RF energy generated by the mobile station to an amount considered safe. Then, any data having a data transmission rate less than or equal to the data rate threshold is transmitted at the increased transmission power.

41 Claims, 8 Drawing Sheets

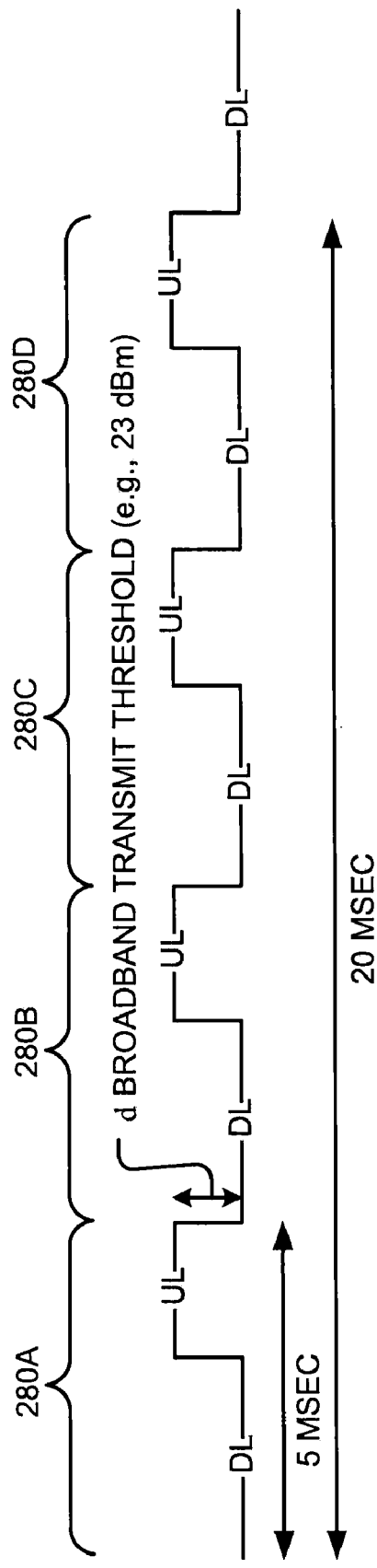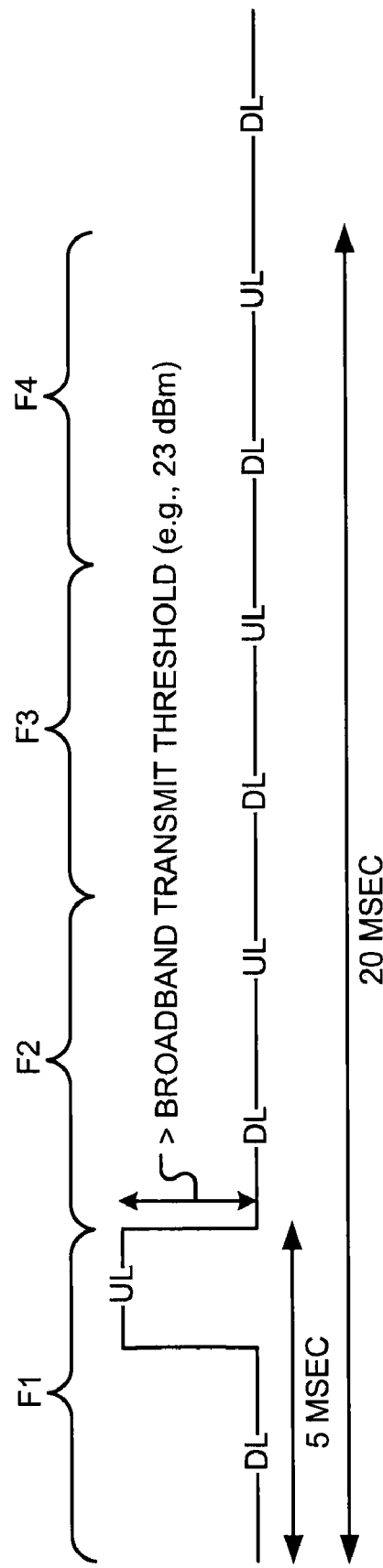

EXTENDED RANGE VOICE OVER IP WIMAX DEVICE

BACKGROUND OF THE INVENTION

1. Field of the Invention

The present invention is directed generally to mobile stations for use in a wireless communication network and more particularly to mobile stations configured to transmit at different power levels.

2. Description of the Related Art

Within a wireless network, a mobile station ("MS") transmits data to a base station ("BS") on an uplink ("UL") portion of a communication link and receives data from the BS on a downlink ("DL") portion of the same communication link. There is a significant disparity in power available to the downlink (i.e., transmission power available at the BS) and the power available to the uplink (i.e., transmission power available at the MS). Therefore, the transmission power of the MS determines, at least in part, the size of the coverage area of the BS with respect to the MS and therefore, the total number of BS required to provide wireless services to the MS in a service area.

The transmission power of mobile stations (including WiMAX mobile stations) is limited by regulatory agencies to at most a maximum threshold transmission power. For example, conventional WiMAX mobile stations are restricted to a maximum transmission power of 23 dBm. Thus, in a conventional WiMAX network, the size of the coverage area of a BS is defined at least in part by the distance over which a 23 dBm signal may be transmitted. Consequently, more base stations are needed to provide wireless services to mobile stations within the service area. Therefore, a need exists for method of extending the transmission range of a mobile station (e.g., a WiMAX device). The present application provides these and other advantages as will be apparent from the following detailed description and accompanying figures.

BRIEF DESCRIPTION OF THE SEVERAL VIEWS OF THE DRAWING(S)

FIG. 3 is an illustration of five consecutive frames transmitting data at a transmission power less than or equal to a broadband transmit power threshold.

FIG. 4 is an illustration of five consecutive frames transmitting data at a data rate less than or equal to a data rate transmission threshold and at a transmission power greater that the broadband transmit power threshold.

DETAILED DESCRIPTION OF THE INVENTION

The following list of abbreviations may be useful in understanding the technology discussed herein:

| | |
|---|---|
| AMC | Adaptive Modulation and Coding |
| BS | Base Station |
| BSC | Base Station Controller |
| CDMA | Code Division Multiple Access |
| CPE | Consumer Premise Equipment |
| CINR | Carrier to Interference-plus-Noise Ratio |
| C-MIMO | Collaborative-Multiple-Input and Multiple-Output |
| CQI | Channel Quality Indication |
| DL | Downlink |
| EIRP | Equivalent Isotropically Radiated Power |
| ERTPS | Extended Real-Time Polling Service |
| EVM | Error Vector Magnitude |
| FCC | Federal Communication Commission |
| FDD | Frequency-Division Duplexing |
| IP | Internet Protocol |
| KBP | Kilobit |
| MCS | Modulation and Coding Scheme |
| MIMO | Multiple-Input and Multiple-Output |
| MS | Mobile Station |
| OFDM | Orthogonal Frequency-Division Multiplexing |
| OFDMA | Orthogonal Frequency-Division Multiple Access |
| PAPR | Peak-To-Average Power Ratio |
| PUSC | Partial Usage of Sub-Channels |
| RF | Radio Frequency |
| RRSI | Received Signal Strength Indicator |
| RSSI | Received Signal Strength Indication |
| SAR | Specific Absorption Rate |
| SDR | Software-Defined Radio |
| SIM | Subscriber Identity Module |
| SS | Subscriber Stations |
| STC | Space-Time Coding |
| TDD | Time-Division Duplex |
| TTLNA | Tower Top Low-Noise Amplifier |
| UL | Uplink |
| VoIP | Voice Over Internet Protocol |
| WiMAX | Worldwide Interoperability for Microwave Access |

Figure 1:
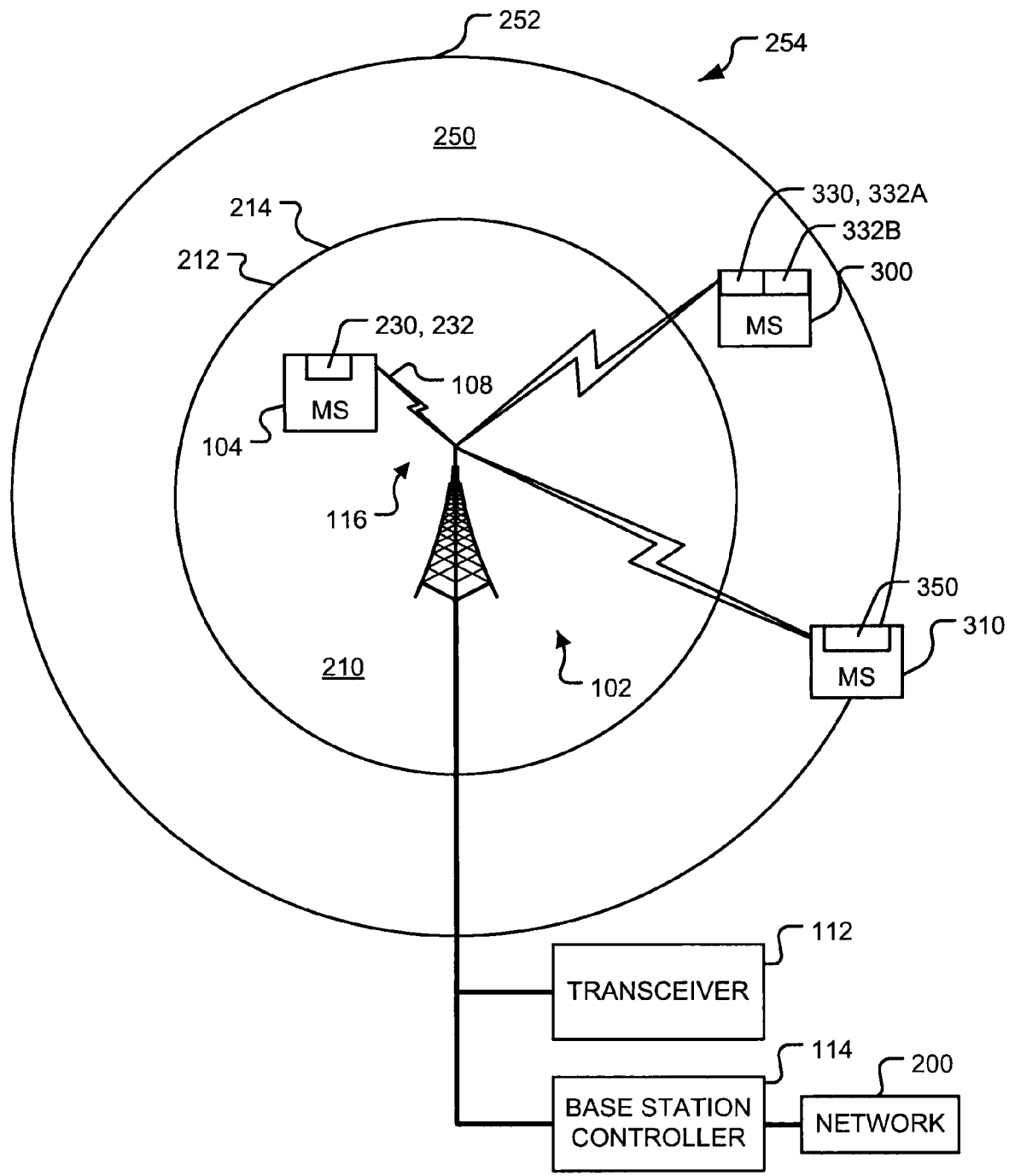
FIG. 1 is an illustration of a total cell coverage area having a broadband coverage area and an extended coverage region.

FIG. 1 illustrates an exemplary base station ("BS") 102 coupled to an exemplary cellular network 200 incorporating multiple BS 102, respectively. The network 200 may be used to implement one or more communication protocols, including, by way of example, Worldwide Interoperability for Microwave Access ("WiMAX"). In network 200, each of the BS 102 is configured to communicate with a plurality of mobile stations over a plurality of communication links. In FIG. 1, the BS 102 is illustrated communicating with a prior art MS 104 over a first wireless communication link 108.

The BS 102 comprises a transceiver 112 and a base station controller ("BSC") 114. In an exemplary embodiment, the transceiver 112 is an OFDM transceiver. The BSC 114 controls operation of the BS 102 and, among other operations, selects the operational frequency and transmit power of the transceiver 112. The BS 102 also has an antenna system 116. Operational details of the BS 102 are known in the art and need not be described in greater detail herein.

The wireless communication link 108 includes an uplink ("UL") portion and a downlink ("DL") portion. The MS 104 transmits data to the BS 102 on the UL portion and receives data from the BS 102 on the DL portion of the communication link 108. The transmission power of the MS 104 determines at least in part, the size of a coverage area 212 of the BS 102 with respect to the MS 104 and therefore, the total number of BS required to provide wireless services to the prior art MS 104 within a service area.

To extend the coverage area 212 of a base station BS 102 with respect to the MS 104, the MS 104 may increase its transmission power. However, the transmission power of the MS 104 is limited by the Federal Communications Commission ("FCC") and other regulatory agencies. For example, the amount of RF energy allowed to be absorbed by the human body is regulated by the FCC and described in the FCC Office of Engineering and Technology Bulletin 65, which specifies for Duty Cycle 1 an Equivalent Isotropically Radiated Power ("EIRP") limit of 33 dBm and Specific Absorption Rate ("SAR") EIRP limit of 23 dBm. The FCC Office of Engineering and Technology Bulletin 65 defines EIRP as "[t]he product of the power supplied to the antenna and the antenna gain in a given direction relative to an isotropic antenna." Power supplied to the antenna is referred to as a "transmit power." Duty cycle is the fraction of time that a system or device is in an "active" state. With respect to a transmission system, its duty cycle is the total duration the transmission system is transmitting over a predetermined period. When the duty cycle of the transmission system is equal to one ("Duty Cycle 1"), the transmission system is transmitting over 100% of the predetermined period. To satisfy EIRP restrictions and limit the RF emissions of mobile stations, the FCC defined the following maximum transmission power limitations.

| Power Class | Maximum Transmission Power |
| --- | --- |
| Power Class 1 Mobile Devices | 33 dBm (i.e., 2 W) |
| Power Class 2 Mobile Devices | 27 dBm (i.e., 500 mW) |
| Power Class 3 Mobile Devices | 23 dBm (i.e., 200 mW) |
| Power Class 4 Mobile Devices | 21 dBm (i.e., 125 mW) |

The above FCC Exposure guidelines are specified as averaged over 30 minutes. The FCC rules with regard to WiMAX broadband time division duplex ("TDD") operations restrict WiMAX devices to transmitting at 23 dBm. Thus, the transmission power of mobile stations (e.g., WiMAX mobile stations) are limited to at most a broadband transmit power threshold (e.g., 23 dBm) set by regulatory agencies.

Aspects of the present disclosure relate to a method of extending the coverage area of a base station in a cellular network. The method extends cell coverage by (1) determining a MS is in a location where either transmitted or received signals are inadequate for broadband communication with the base station, (2) increasing the transmission power of the MS beyond the broadband transmit power threshold, and (3) if applicable, reducing the throughput (i.e., data transmission rate) of the data transmitted by the MS at the increased power level. While the transmission power is increased above the broadband transmit power threshold, by reducing the data transmission rate, the amount of EIRP and SAR EIRP to which the user is exposed does not exceed the limits set by the FCC and other applicable regulatory agencies.

Aspects of the present disclosure also relate to mobile stations configured to amplify signals such that the transmission power is greater than the broadband transmit power threshold for transmission at the reduced data transmission rate. The aforementioned method may be implemented in either a single chain transmit WiMAX device architecture (e.g., a MS having a single power amplifier configured to amplify signals such that the transmission power is greater than the broadband transmit power threshold) or a dual chain transmit WiMAX device architecture (e.g., a MS having a pair of power amplifiers each configured to amplify signals such that the transmission power is at most the broadband transmit power threshold).

Although referred to herein as "Mobile Stations," those skilled in the art will appreciate that a user can be in a fixed location, such as a home or office, and communicate with the BS 102 without physically changing location. The present disclosure is not limited to a MS that is actually moving. Thus, the MS may include consumer premise equipment ("CPE") and subscriber stations ("SS") operated at a fixed location.

The prior art MS 104 transmits signals using one or more power amplifiers 232 each operating at a power level at or below the broadband transmit power threshold. The power amplifiers 232 of the prior art MS 104 are each connected to a separate antenna 230 and cannot be combined to amplify an outbound signal such that the transmission power is above the broadband transmit power threshold. Within the coverage area 212, the signal transmitted by the MS 104 and received by the BS 102 is adequate for broadband communications. Thus, the conventional coverage area 212 of the BS 102 will be referred to as the broadband coverage area. Outside the broadband coverage area 212, the signal transmitted by the MS 104 and received by the BS 102 is inadequate to permit communications between the MS 104 and the BS 102.

In accordance with aspects of the present disclosure, an extended coverage region 250 is defined between an extended boundary 252 and the cell boundary 214 defining the broadband coverage area 212. Within the extended coverage region 250, mobile stations (e.g., a MS 300 and a MS 310) must transmit signals at a power level greater than the broadband transmit power threshold to effect communications with the BS 102. The extended boundary 252 is defined at least in part by a maximum transmission power of the MS 300 and the MS 310. Thus, for the prior art MS 104, there is no extended boundary 252 or extended coverage region 250. The broadband coverage area 212 and the extended coverage region 250 combined define a total coverage region 254 for the BS 102.

Those skilled in the art will appreciate that the MS 300 may be within the broadband coverage area 212, but still have inadequate UL signal quality because of terrain (e.g., a hill) or obstruction (e.g., a tall building) that at least partially blocks the signal from the MS 300. For purposes of the present discussion, an MS (e.g., the MS 300) that is within the broadband coverage area 212, but unable to communicate effectively, will be treated as if it is in the extended coverage region 250.

For illustrative purposes, the present invention is described with respect to an exemplary WiMAX implementation. However, those of ordinary skill in the art appreciate that the present teachings may be applied to other wireless communication protocols in which the mobile stations are configured to transmit with a duty cycle that is less than one. For example, through application of ordinary skill in the art to the present teachings, implementations may be constructed for communication protocols that use time division duplex ("TDD") to transmit communications between the mobile stations and base stations. By way of another example, implementations may be constructed for communication protocols in which the mobile stations do not transmit and receive communications simultaneously (i.e., the uplink and downlink signals are separated in time). Therefore, such alternate implementations are within the scope of the present teachings.

WiMAX

WiMAX broadband services are provided over channels, which are typically 5 MHz, 10 MHz, or 20 MHz. At the physical layer of the Open Systems Interconnection Reference Model (or OSI Model), WiMAX uses orthogonal frequency-division multiplexing ("OFDM") to divide a channel into a large number of closely-spaced orthogonal subcarriers. To provide multiple access, WiMAX uses Orthogonal Frequency-Division Multiple Access ("OFDMA") to assign subsets of subcarriers to sub-channels. Each sub-channel is then assigned to an individual user.

Sub-channelization refers to the division of available sub-carriers into sub-channels. Sub-channels may include contiguous subcarriers or subcarriers pseudo-randomly distributed across the frequency spectrum. WiMAX defines several sub-channelization schemes based on distributed carriers for both the uplink and the downlink. Partial usage of subcarriers ("PUSC") is a sub-channelization scheme using subcarriers distributed across the frequency spectrum. Band adaptive modulation and coding ("AMC") is a WiMAX sub-channelization scheme using contiguous subcarriers. It may be desirable to use AMC to transmit data at a reduced throughput within the extended coverage region 250 (see FIG. 1) because a mobile device using AMC may use beamforming technologies (which are tailored around AMC permutation) to further extend coverage areas.

Many mobile stations or devices transmit and receive simultaneously. For example, code division multiple access ("CDMA") based mobile stations and mobile stations implementing frequency-division duplexing ("FDD") transmit and receive simultaneously. Thus, such devices operate at or near Duty Cycle 1. Therefore, limiting such devices to transmitting at or below 23 dBm helps ensure the SAR EIRP limit of 23 dBm will not be exceeded when the devices are operated by users.

However, many WiMAX mobile stations do not transmit and receive simultaneously. For example, WiMAX may implement time division duplex ("TDD") which separates uplink and downlink data signals in time. Thus, such WiMAX stations operate below a duty cycle of one.

Figure 2:
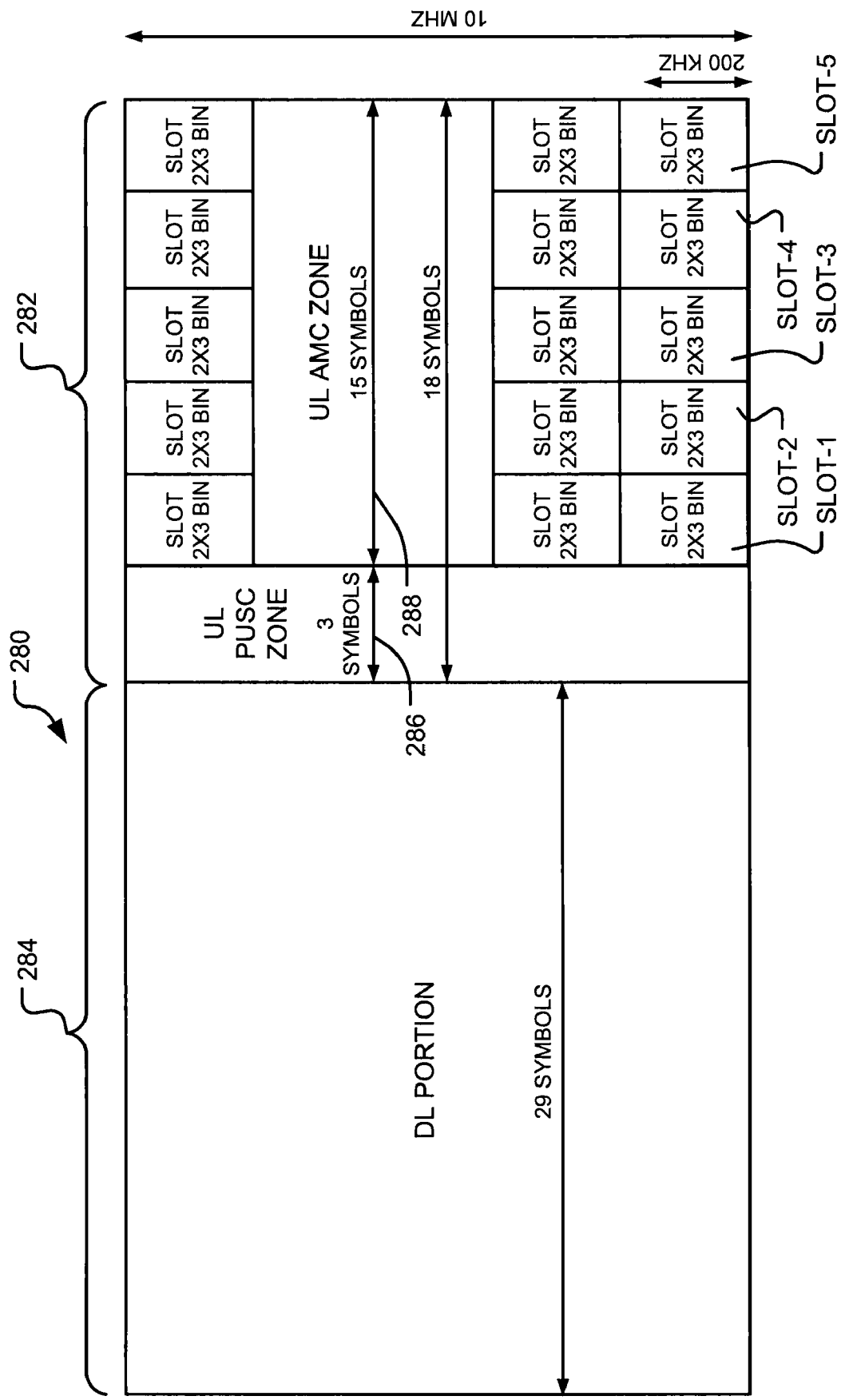
FIG. 2 is an illustration of an exemplary frame having an uplink and a downlink portion.

The uplink and downlink data signals are transmitted over the sub-channel assigned to a user in frames. FIG. 2 provides an illustration of an exemplary frame 280. Those of ordinary skill in the art appreciate that the frame 280 is provided merely for illustrative purposes and many alternate frame configurations are known in the art. The invention is not limited by the configuration of the frames used or how data is allocated within the frame.

The frame 280 includes an uplink portion 282 and a downlink portion 284. A static asymmetric division of the uplink and downlink portions 282 and 284 of the frame 280 may be used to define an asymmetry between the amount of data transmitted in the uplink portion 282 of the frame 280 and the amount of data received in the downlink portion 284 of the frame 280. However, TDD has the advantage of being able to vary the uplink and downlink data rates. If the amount of uplink data increases, more bandwidth can be allocated to the uplink dynamically from the downlink and conversely, if the amount of downlink data increases, more bandwidth can be allocated to the downlink dynamically from the uplink. Therefore, a dynamic asymmetric division of the uplink and downlink portions 282 and 284 of the frame 280 may be used.

The frame 280 includes all of the sub-channels of the channel and transmits a number of symbols (e.g., 48 symbols, which includes 29 symbols transmitted in the downlink portion 284, 18 symbols transmitted in the uplink portion 282, and one symbol allowing for receiver-to-transmitter switching during which no transmission occurs in downlink or uplink portions). Thus, total communication capacity of the frame 280 may be viewed as a time/frequency grid or symbol/sub-channel grid. An asymmetry ratio is a ratio of a number of symbols received on the downlink portion 284 to a number of symbols transmitted on the uplink portion 282. WiMAX mobile stations typically have an asymmetry ratio of about 29/18.

The time/frequency grid of the frame 280 may be divided into permutation zones, which are groupings of contiguous symbols that use the same sub-channelization scheme. Each of the zones is divided into slots, a slot being the basic unit of allocation in the symbol/sub-channel grid. In WiMAX, uplink frequency slot allocation may be assigned dynamically by a base station on a per frame basis. Zones can be configured to make use of multi-antenna technology, including phased array beamforming, space-time coding ("STC"), and multiple-input and multiple-output ("MIMO") techniques. For example, referring to FIG. 2, the unlink portion 282 of the frame includes an UL PUSC zone 286, and an UL AMC zone 288.

In the frame 280 illustrated, the UL PUSC zone 286 is three symbols long and the UL AMC zone 288 is 15 symbols long. Therefore, the UL portion of the frame 280 includes 18 symbols. As mentioned above, a frame may transmit 47 symbols. An additional symbol is included in a preamble (not shown) preceding the frame 280. Thus, the duty cycle for the WiMAX transmission system is about 0.38 (18/47), which is significantly less than one. In fact, the duty cycle for such a WiMAX transmission system is less than 40%.

FIG. 3 illustrates a typical duty cycle of the transmission system of the prior art MS 104 (see FIG. 1) when it is transmitting four consecutive WiMAX frames 280A to 280D. The four consecutive frames 280A to 280D are transmitted in 20 msec at a transmission power less than or equal to the broadband transmit power threshold. In FIG. 3, the UL portions 282 (see FIG. 2) of the frames 280A to 280D are labeled "UL," and the DL portions 284 (see FIG. 2) of the frames 280A to 280D are labeled "DL."

Because the duty cycle is less than one, the amount of RF energy to which a user is exposed by a WiMAX transmission system is not necessarily equivalent to its transmission power (e.g., 23 dBm). Therefore, the transmission power of such devices may be increased above the broadband transmit power threshold based on the percentage of time the transmission system of such devices is active (e.g., about 37%). This means the UL transmission power of a WiMAX mobile station (and other devices not transmitting continuously) may be increased above the broadband transmit power threshold (e.g., 23 dBm) without violating the FCC guidelines. If data is transmitted only in the UL AMC zone 288 (e.g., to take advantage of beamforming), the duty cycle for the transmission system further reduces to about 0.319 (15/47).

Some applications, such as VoIP, do not transmit data in every frame. For example, a VoIP application may transmit data only every 20 msec (or once every four frames). Thus, the duty cycle for a transmission system when used exclusively for such applications may be about 0.079 (15/(47×4)). Under these circumstances, the duty cycle is less than 8%. Therefore, for applications, such as VoIP, that do not transmit data in every frame, the UL transmission power of a WiMAX mobile station (or other device using TDD) may be increased above the broadband transmit power threshold (e.g., 23 dBm) without violating the FCC guidelines.

FIG. 4 illustrates an example duty cycle of an exemplary WiMAX transmission system transmitting only VoIP data every 20 msec at greater than the broadband transmit power threshold. FIG. 4 illustrates four consecutive frames "F1," "F2," "F3," and "F4." transmitted in 20 msec. Each of the frames "F1," "F2," "F3," and "F4" may be constructed in general accordance with the frame 280 illustrated in FIG. 2. In FIG. 4, the UL portions 282 (see FIG. 2) of the frames "F1," "F2," "F3," and "F4" are labeled "UL," and the DL portions 284 (see FIG. 2) of the frames are labeled "DL." When transmitting VoIP data, the WiMAX mobile station transmits in the UL portion of a first frame "F1" and forgoes transmitting in the UL portions of three subsequent frames "F2," "F3," and "F4." As is apparent to those of ordinary skill in the art, when transmitting VoIP data, the WiMAX mobile station need not use every fourth frame. Thus, data is transmitted in at most 25% of the frames. Within the first frame "F1," multiple users may transmit VoIP data using different sub-channels.

VoIP is characterized as a low bandwidth (i.e., typically using less than 50 kilobit ("kbp") per second), delay sensitive (i.e., typically having a mouth-to-ear delay less than about 250 msec), low jitter, and low packet error rate (i.e., typically having a packet error rate less than 5%) application. Table A provides exemplary operating parameters used to transmit VoIP data over a WiMAX system.

TABLE A

| Voice Codec | G. 729 |
| --- | --- |
| Voice Bandwidth | 8 Kbps |
| Packets Time | 20 msec |
| IP Header | 23.2 Kbps |
| IP Header-ROHC | 2.32 Kbps |
| VoIP Bandwidth | 10.32 Kbps |
| Bits/Frame | 207 |
| AMC/PUSC Slots-QPSK-½ | 5 |

Currently available WiMAX systems are designed to provide VoIP services at 4 kbp/sec to 100 kbp/sec. Depending upon the audio compression method used, 8 kps/sec to 64 kps/sec is considered to be telephone quality. In the UL AMC zone 288, a slot is about 200 KHz wide. Thus, five contiguous slots (e.g., slots "SLOT-1," "SLOT-2," "SLOT-3," and "SLOT-4") may be allocated to a single user as a sub-channel and used to transmit VoIP data to a nearby BS 102 (see FIG. 1). Further, PUSC modulation may be used (in the UL PUSC zone 286 or otherwise) to transmit the VoIP data which means the entire channel (e.g., 10 MHz) may be used.

Mobile Stations

Figure 5:
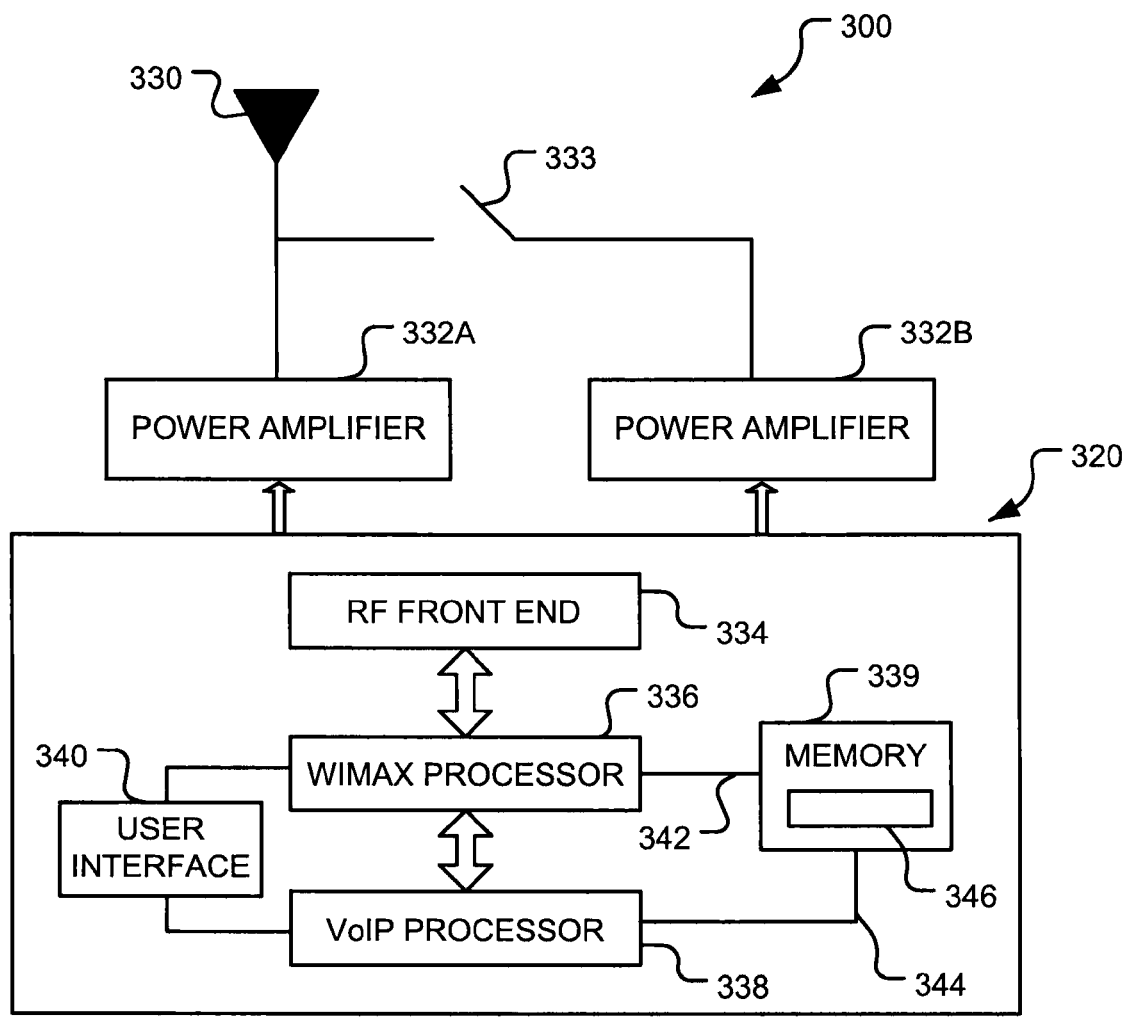
FIG. 5 is a block diagram illustrating a first embodiment of a mobile station configured to implement the methods of FIGS. 7 and 8.

FIG. 5 provides a block diagram illustrating the components of the MS 300. The MS 300 has a transmission system 320 including an antenna 330, a pair of power amplifiers 332A and 332B, a RF switch 333, a radio frequency front end 334, a broadband signal processor 336 (e.g., a WiMAX processor), a narrowband signal processor 338 (e.g., a VoIP processor), memory 339, and a user interface 340. While the radio frequency front end 334, the broadband signal processor 336, and the narrowband signal processor 338 have been illustrated as separate components, two or more of the radio frequency front end 334, the broadband signal processor 336, and the narrowband signal processor 338 may be implemented together on the same processor and such embodiments are within the scope of the present teachings.

Each of the power amplifiers 332A and 332B may be configured to amplify an outbound signal such that the transmission power is at most the broadband transmit power threshold. In alternate implementations, one or both of the power amplifiers 332A and 332B may be configured to amplify an outbound signal such that the transmission power is above the broadband transmit power threshold.

The memory 339 stores computer-executable instructions 346 executable by the processors 336 and 338 and data accessible by the processors 236 and 238. The broadband signal processor 336 is coupled to the RF switch 333 and configured to switch it on and off. When the RF switch 333 is open (or switched off) outbound signals transmitted by the antenna 330 are amplified by only the power amplifier 332A. When the RF switch 333 is closed (or switched on) outbound signals transmitted by the antenna 330 are amplified by both power amplifiers 332A and 332B. Thus, the broadband signal processor 336 determines the transmission power of the MS 300 by determining whether outbound signals transmitted by the antenna 330 are amplified by the power amplifier 332B. Further, depending upon the implementation details, the broadband signal processor 336 may adjust the output power of the power amplifiers 332A and 332B.

Optionally, the broadband signal processor 336 may be coupled to the power amplifiers 332A and 332B and configured to switch them on and off. Thus, the broadband signal processor 336 may determine the transmission power of the MS 300 by determining which of the power amplifiers 332A and 332B is switched on. Further, depending upon the implementation details, the broadband signal processor 336 may adjust the output power of the power amplifiers 332A and 332B after they are turned on.

The broadband signal processor 336 and the narrowband signal processor 338 are both configured to receive a signal from a user interface 340 for transmission by the MS 300. The outbound signal is processed by at least one of the broadband and narrowband signal processors 336 and 338 for transmission and forwarded to the RF front end 334 as a digital signal. The RF front end 334 converts the digital signal to an analog signal and forwards the analog signal to one or both of the power amplifiers 332A and 332B. The power amplifiers 332A and 332B amplify the analog signal. The amplified analog signal is then transmitted by the antenna 330.

The broadband and narrowband signal processors 336 and 338 may each be implemented by any known technology, such as a microprocessor, microcontroller, application-specific integrated circuit (ASIC), digital signal processor (DSP), or the like. The broadband and narrowband signal processors 336 and 338 are integrated into an electrical circuit, such as a conventional circuit board, that supplies power to the broadband and narrowband signal processors 336 and 338. The broadband and narrowband signal processors 336 and 338 may each include internal memory and are coupled to the memory 339. The memory 339 may be coupled to the broadband and narrowband signal processors 336 and 338 by internal buses 342 and 344, respectively.

The memory 339 may comprise random access memory (RAM) and read-only memory (ROM). The memory 339 contains computer-executable instructions 346 and data that control the operation of the broadband and narrowband signal processors 336 and 338. The memory 339 may also include a basic input/output system (BIOS), which contains the basic routines that help transfer information between elements within the mobile station 300. The present invention is not limited by the specific hardware component(s) used to implement the broadband signal processors 336, the narrowband signal processor 338, or the memory 339 components of the mobile station 300.

Optionally, the memory 339 may include external or removable memory devices such as a Subscriber Identity Module ("SIM") card, flash memory device, and the like. The mobile station 300 may also include one or more I/O interfaces (not shown) such as a serial interface (e.g., RS-232, RS-432, and the like), an IEEE-488 interface, a universal serial bus (USB) interface, a parallel interface, and the like, for communication with computing devices, removable memory devices (such as flash memory drives, external floppy disk drives, etc.), and the like.

When executed by the broadband signal processor 336, the computer-executable instructions 346 stored in the memory 339 direct the broadband signal processor 336 to perform one or both of the methods 500 and 600 (described below). Following a power-up operation, the MS 300 executes the computer-executable instructions 346 implementing the method 500.

The user interface 340 may include a telephone key pad, an alphanumeric keypad, keys (e.g., input keys, preset hot keys, programmable hot keys, etc.), buttons (e.g., a left action button, a right action button, a navigation button, a multidirectional navigation button, etc.), switches (e.g., a volume switch, a ringer on/off switch, etc.), and so forth. The user interface 340 may include a display device, such as a liquid crystal display (LCD) device. The user interface 340 also includes an audio input device (e.g., a microphone), and audio output device (e.g., one or more speakers, an audio port to connect an audio headset, and the like). Optionally, the user interface 340 may include an image capture device (e.g., a camera, video camera, and the like).

As illustrated in FIG. 5, the power amplifiers 332A and 332B are the last amplifier in a transmission chain (the output stage) before the antenna 330. As discussed above, in some implementations of the MS 300, each of the power amplifiers 332A and 332B may be configured to amplify an analog signal such that the transmission power is, at most, the broadband transmit power threshold. Alternatively, one or both of the power amplifiers 332A and 332B may be configured to amplify an analog signal such that the transmission power is above the broadband transmit power threshold.

Figure 6:
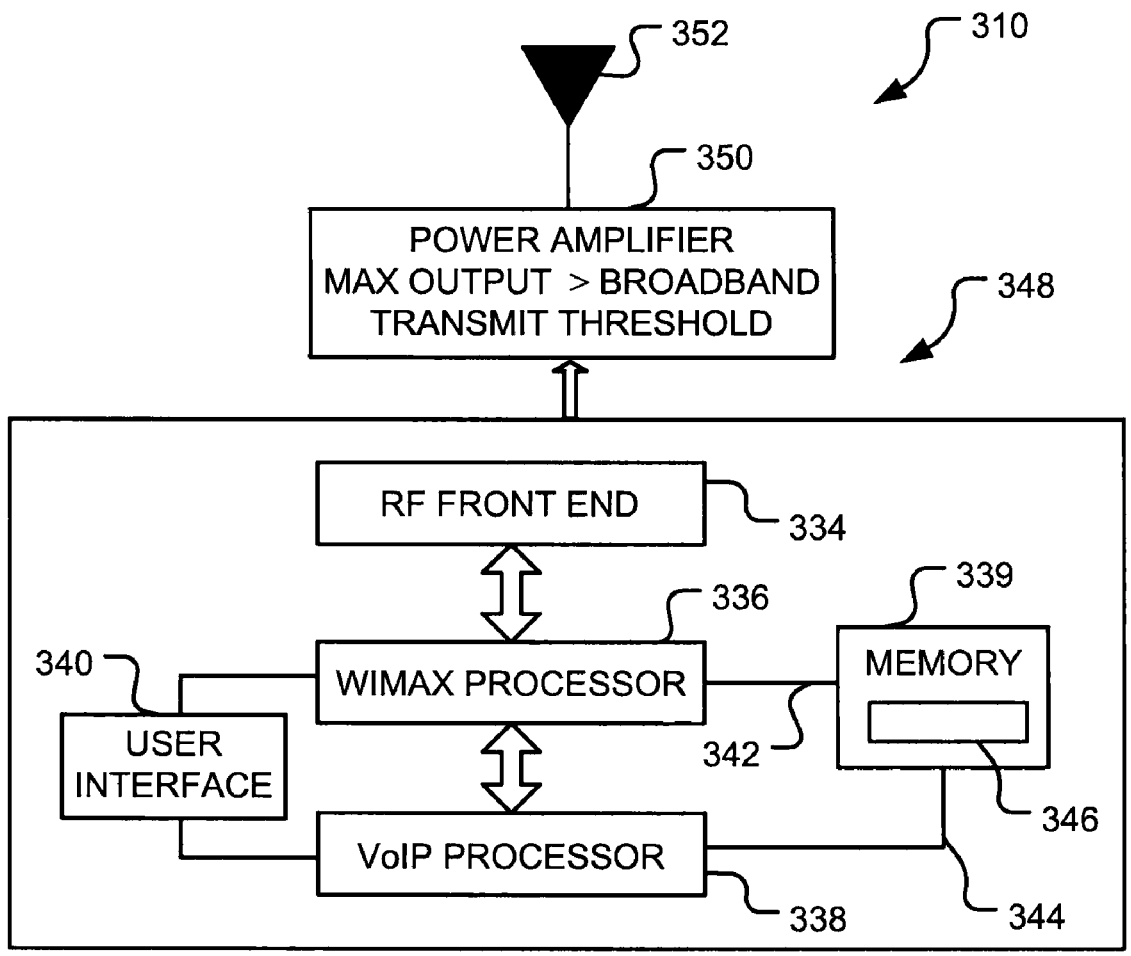
FIG. 6 is a block diagram illustrating a second embodiment of a mobile station configured to implement the methods of FIGS. 7 and 8.

Turning to FIG. 6, the MS 310 will be described. The MS 310 includes a transmission system 348. Like components of the transmission system 348 of the MS 310 and the transmission system 320 (see FIG. 5) of the MS 300 (see FIG. 5) have been identified using like reference numerals. Only components of the transmission system 348 differing substantially from those of the transmission system 320 (see FIG. 5) will be described in detail.

The transmission system 348 includes a power amplifier 350 coupled to a single antenna 352. The power amplifier 350 is capable of amplifying an outbound signal such that the transmission power is at a first power level (e.g., less than or equal to the broadband transmit power threshold) suitable for transmitting communications within the broadband coverage area 212 (see FIG. 1) of the nearby BS 102 and a second (higher) power level (e.g., greater than the broadband transmit power threshold) for transmitting communications within the extended coverage region 250 (see FIG. 1). The broadband signal processor 336 is coupled to the power amplifier 350 and configured to determine the power level at which the power amplifier 350 operates. The power amplifier 350 may be implemented as a single extended power amplifier having a maximum power output of about 27 dBm ERP or higher. Because certain wireless technologies (such as WiMAX) operate below Duty Cycle 1, they emit less RF energy over a given duration than mobile stations operating at Duty Cycle 1, and may be used for certain lower throughput applications without exceeding the limitations imposed on mobile stations by the FCC and other governmental agencies.

As will be described below, the method 500 implemented by the computer-executable instructions 346 stored in the memory 339 determines the output power of the power amplifiers 332A and 332B (see FIG. 5), and the output power of the power amplifier 350. This determination may be based at least in part on the DL Modulation and Coding Scheme ("MCS") used to transmit the outbound data, DL Received Signal Strength Indicator ("RRSI") level, application type, and bandwidth required.

In implementations of the MS 300 where the power amplifiers 332A and 332B each amplify the outbound signal such that the transmission power is at most the broadband transmit power threshold, to achieve a transmission power greater than the broadband transmit power threshold, both power amplifiers 332A and 332B must be switched on and used together. Thus, in embodiments including the RF switch 333, to achieve a transmission power greater than the broadband transmit power threshold, the RF switch 333 must be closed.

In alternate implementations, one of the power amplifiers 332A and 332B may be configured to amplify the outbound signal such that the transmission power is above the broadband transmit power threshold. In such implementations, the power amplifier (e.g., power amplifier 332A) configured to amplify the outbound signal such that the transmission power is above the broadband transmit power threshold may be connected to the antenna 330 and used to achieve a transmission power greater than the broadband transmit power threshold. Optionally, the other power amplifier (e.g., the power amplifier 332B) may be switched off (e.g., the RF switch 333 positioned between the power amplifier and the antenna 330 opened to disconnect the power amplifier 332B from the antenna 330). To increase the transmission power further, the second power amplifier (e.g., power amplifier 332B) may be switched on and both power amplifiers 332A and 332B may be used together. In embodiments including the RF switch 333, the second RF switch is closed to connect the second power amplifier to the antenna 330 so that both power amplifiers 332A and 332B may be used together.

OFDMA imposes much more stringent requirements on power amplifier linearity, efficiency, peak-to-average power ratio ("PAPR"), and error vector magnitude ("EVM") to support the required peak-to-average ratio and higher order modulation. Power consumption of a power amplifier is proportional to its transmit time and does not depend much on signal bandwidth.

In general, a power amplifier having a higher power output (e.g., the power amplifier 350) requires a higher voltage supply to provide the same performance as a power amplifier (e.g., a 23 dBm power amplifier) having a lower output power. For example, as mentioned above, the prior art MS 104 has one or more power amplifiers 232 each restricted to operation at or below the broadband transmit power threshold (e.g., 23 dBm). Further, if the MS 104 includes more than one power amplifier 232, they cannot be combined to amplify an outbound signal such that the transmission power is above the broadband transmit power threshold. If the MS 104 has two power amplifiers 232 each constructed as 23 dBM power amplifiers, they will typically require a 3.3 V battery to operate. It is believed that a 27 dBM power amplifier may require a larger battery supply (e.g., about 5 V battery supply to about 6 V battery supply). However, at this time, certain power amplifier vendors are developing a commercial 27 dBm power amplifier that can be operated using a 3.3 V battery. It is expected that by the second quarter of 2009, there will be a commercially available power amplifier capable of operating on a 3.3 V battery and delivering a power output of about 25 dBm to about 27 dBm. Depending upon implementation details, it may be desirable to select a power amplifier capable of amplifying the transmitted signal above 27 dBM. However, when doing so, it may be desirable to consider the tradeoff between output power and both available battery life and voltage supply requirements.

By way of non-limiting examples, the following companies provide power amplifiers used for WiMAX mobile stations: Anadigics, MicroMobio, Analog Devices, and SiGi. Currently, a 23 dBm power amplifier for use in a WiMAX mobile stations costs about $2.00 in a quantity of 100 K units and a 27 dBm power amplifier for use in a WiMAX mobile stations costs about $3.00 to about $3.50 in quantity of 100 K units. It is predicted that high-end power amplifiers may cost up to about $5.00 depending on quantity and desired features.

As is apparent to those of ordinary skill in the art, the MS 300 does not require a higher voltage battery (e.g., greater than 3.3 V) than that used in the prior art MS 104. Further, the MS 300 may consume less power stored by the battery than the MS 310. The MS 300 may also use currently available chipsets, such as those configured for WiMAX.

To transmit at a power level greater than the broadband transmit power threshold, the broadband signal processor 336 may turn on both of the power amplifiers 332A and 332B when MS 300 is in the extended coverage region 250. For example, the broadband signal processor 336 may close the RF switch 333. As is apparent to those of ordinary skill in the art, the two transmit chains may be used to provide UL beamforming, MIMO, and the like. Although the power amplifiers 332A and 332B together may cost more than the single power amplifier 350 (see FIG. 6) of the MS 310, the MS 300 may use a lower cost battery. Therefore, depending upon the implementation details, both the MS 300 and the MS 310 may be produced for a similar cost. However, this is not a requirement.

Methods

Figure 7:
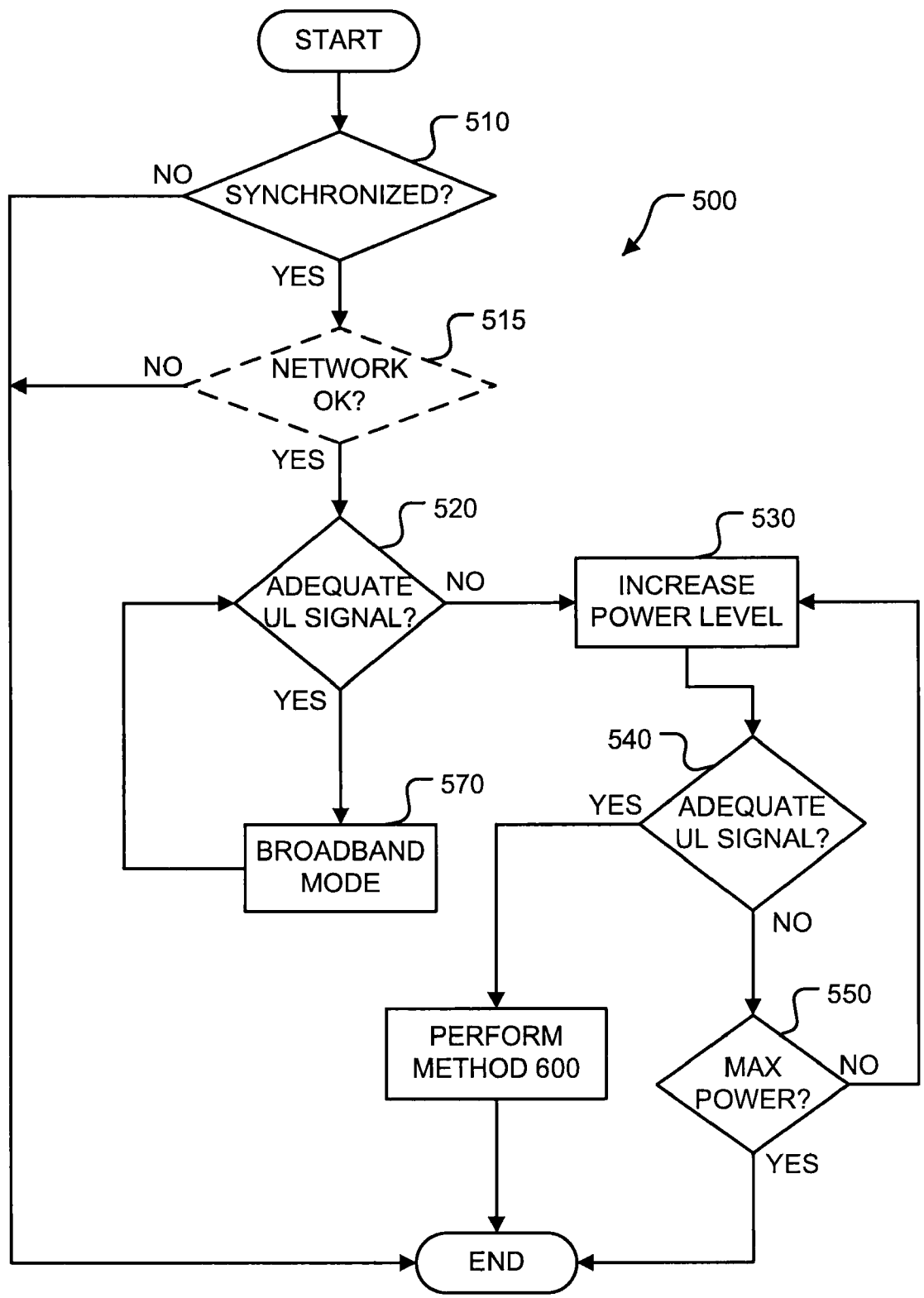
FIG. 7 is a flow diagram of a method of determining the transmission power of the mobile stations of FIGS. 5 and 6 based on the quality of the uplink signal received by a nearby base station from the mobile stations and the quality of the downlink signal received by the mobile stations from the nearby base station.
Figure 8:
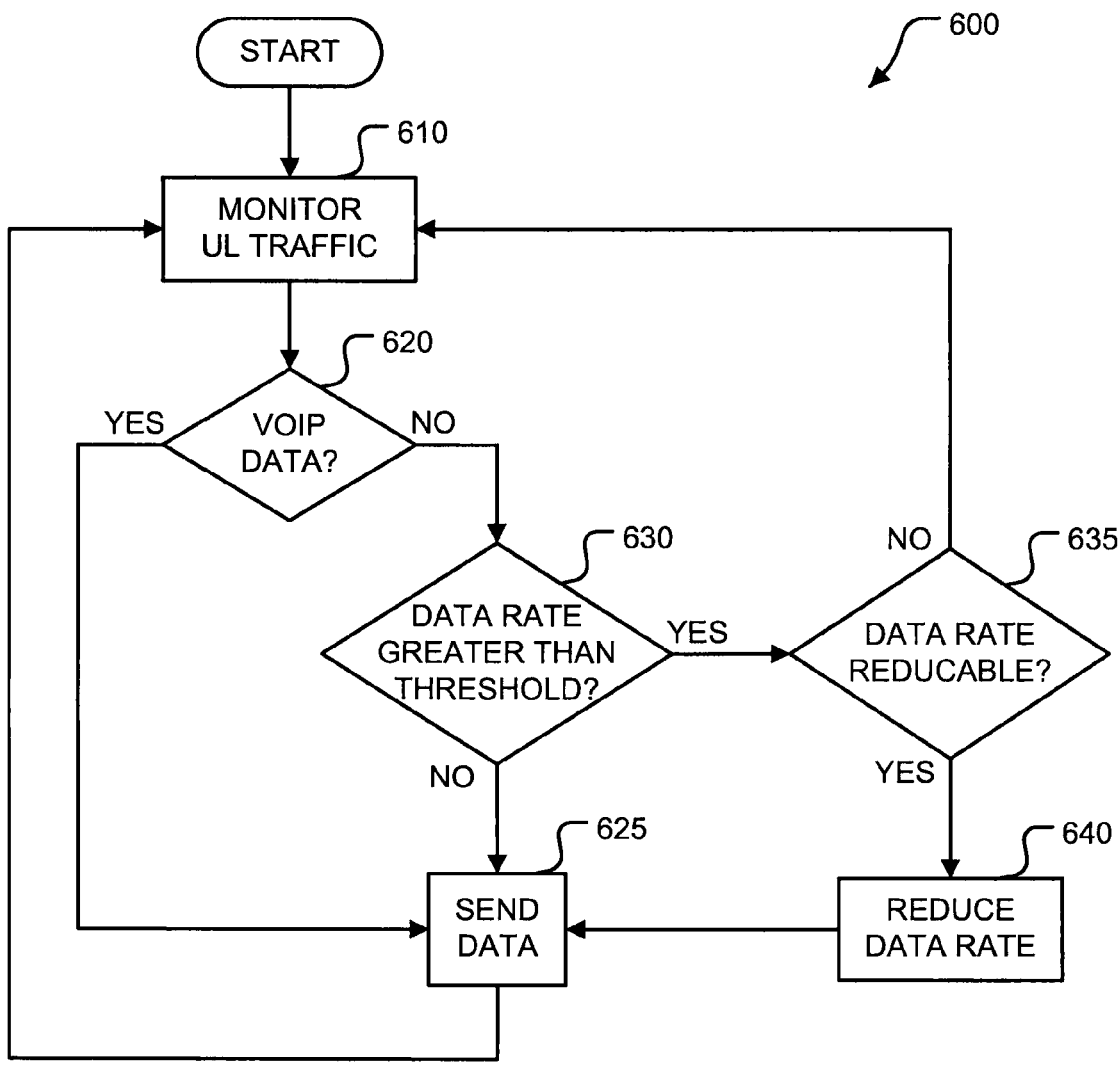
FIG. 8 is a flow diagram of a method of transmitting data within the extended coverage area of a cell when the mobile stations of FIGS. 5 and 6 are configured to transmit at a power level above the broadband transmit power threshold.

FIGS. 7 and 8 provide flow diagrams of the methods 500 and 600, respectively, that may be performed by a MS (e.g., the MS 300 and/or the MS 310) to extend the coverage area of a nearby BS 102 (see FIG. 1) so that the MS may communicate with the nearby BS. Alone and in combination the methods 500 and 600 may be used to extend the coverage area of the nearby BS for low throughput data applications (such as VoIP) while satisfying FCC and other regulatory rules related to maximum transmission power for a mobile station (e.g., 23 dBm for a typical WiMAX mobile device). The methods 500 and 600 may monitor RF downlink parameters and adjust uplink transmission power and/or throughput (e.g., data transmission rate) appropriately to maintain the transmission power of the MS within the limits proscribed by regulatory agencies. Alone and in combination the methods 500 and 600 may be used to increase the size of the total coverage area 254 (see FIG. 1) of the nearby BS 102 (see FIG. 1) for narrowband or low throughput applications (such as VoIP), while at the same time maintaining broadband services within the broadband coverage area 212 (see FIG. 1).

Both methods 500 and 600 may be implementable entirely in a MS. For example, the methods 500 and 600 may be implemented in the MS 300 and/or the MS 310 and used with the prior art network 200 (see FIG. 1), described above. Further, the methods 500 and 600 may be implemented in software installed in the MS 300 and/or the MS 310. A Software-Defined Radio ("SDR") system is a radio communication system in which components that have traditionally been implemented in hardware (e.g., mixers, filters, amplifiers, modulators/demodulators, detectors, etc.) are instead implemented in software. The methods 500 and 600 may be characterized as implementing an SDR system in the MS 300 and/or the MS 310.

The method 500 controls the transmission power of a MS (e.g., the MS 300 and/or MS 310) and the method 600 controls the throughput or bandwidth of the data transmitted.

Turning to the method 500, the method 500 may be used to turn on both of the power amplifiers 332A and 332B of the MS 300 at the same time to increase the transmission power of the MS 300. Depending upon the implementation details, to turn on both power amplifiers 332A and 332B, the method 500 closes the RF switch 333. After the power amplifiers 332A and 332B are turned on, their combined power output may be determined by the method 500. Further, the method 500 may be used to control the power output of the power amplifier 350 in the MS 310. For ease of illustration, the method 500 will be described with respect to the MS 300. However, where the implementation of the method 500 in the MS 310 differs from the implementation of the method 500 in the MS 300, those differences are described.

Referring to FIG. 1, as is apparent to those of ordinary skill in the art, after the MS 300 powers up, it attempts to connect to the network 200 (see FIG. 1). This process involves (1) synchronizing the transmit/receive operations of the MS 300 with those of the BS 102 to which the MS 300 is attempting to connect, (2) ranging, and (3) authenticating/registering with the network 200 (see FIG. 1). During the ranging operation, the BS 102 transmits ranging responses ("RNG-RSP") to the MS 300 indicating adjustments (timing offsets, transmission power adjustments, and the like) to the uplink signal transmitted by the MS 300.

Turning to FIGS. 5 and 7, in decision block 510, the broadband signal processor 336 determines whether the MS 300 has successfully synchronized with the network 200 (see FIG. 1). The decision in decision block 510 is "NO," if the MS 300 is not connected to the network 200 (see FIG. 1) or the MS is not synchronized with the network. Otherwise, the decision in decision block 510 is "YES."

If the decision in decision block 510 is "NO," the method 500 terminates. On the other hand, when the decision in decision block 510 is "YES," in optional decision block 515, the method 500 may determine whether the MS 300 is connected to a particular network (e.g., a Clear network). If the decision in decision block 510 is "YES," the method 500 advances to decision block 520. If the decision in decision block 510 is "NO," the method 500 terminates. Thus, performance of the method 500 may be restricted to use with one or more selected networks.

In decision block 520, the broadband signal processor 336 determines whether the BS 102 (see FIG. 1) is receiving an adequate UL signal from the MS 300. Referring to FIG. 1, the received signal may be inadequate if the MS 300 is located at or near the cell boundary 214 of the broadband coverage area 212 of the BS 102 with which the MS is synchronized. As discussed in the Background Section, the BS 102 is capable of transmitting further than the prior art MS 104. Under these circumstances, the MS 104 can receive transmissions from the BS 102 at distances over which the BS cannot receive transmissions from the MS sent using its 23 dBm power amplifiers.

When the BS 102 determines it is receiving an inadequate uplink signal from the MS 300, it may communicate this information to the MS 300 in a ranging response. In other words, when the BS 102 determines the quality of the uplink signal is unsatisfactory, the BS sends a notification (e.g., in a ranging response) to the MS 300 indicating the uplink signal quality is not acceptable. This notification may be sent on an UL ranging control channel, which may be sent in a portion of the DL portion 284 (see FIG. 2) of a frame 280 (see FIG. 2). Returning to FIGS. 5 and 7, by way of a non-limiting example, the broadband signal processor 336 may determine the BS 102 (see FIG. 1) is receiving an inadequate UL signal from the MS 300 based on one or more ranging responses received from the BS 102.

If the decision in decision block 520 is "NO," the MS 300 concludes the BS 102 is receiving an inadequate UL signal from the MS (e.g., referring to FIG. 1, the MS is at or near the boundary 214 of the broadband coverage area 212). Otherwise, if the MS 300 concludes the BS 102 is receiving an adequate UL signal from the MS, the decision in decision block 520 is "YES."

If the decision in decision block 520 is "NO," in block 530, the transmission power of the MS 300 is increased to a value greater than the broadband transmit power threshold. For example, in block 530, both power amplifiers 332A and 332B may be turned on at the same time, the RF switch 333 closed to connect both power amplifiers 332A and 332B to the antenna 330, and the like. If one of the power amplifiers 332A was already switched on, the other of the power amplifiers 332A and 332B is switched on. For example, if the power amplifier 332A was being used to amplify the outbound signal, the RF switch 333 may be closed and both power amplifiers 332A and 332B used to amplify the outbound signal. Thus, both power amplifiers 332A and 332B may be used to transmit the outbound signal at the same time at a combined transmission power greater than the broadband transmit power threshold. As is apparent to those of ordinary skill in the art, the combined power of the power amplifiers 332A and 332B may be larger than is required. Thus, after both power amplifiers 332A and 332B are turned on, the broadband signal processor 336 may set the transmission power to an initial level greater than the broadband transmit power threshold.

When the method 500 is implemented in the MS 310, in block 530, the output power level of the power amplifier 350 (see FIG. 6) may be increased. By way of a non-limiting example, the output power level may be increased by a predetermined incremental amount (e.g., 0.5 dBm, 1 dBm, 1.5 dBm, 2 dBm, etc.).

Then, in decision block 540, the broadband signal processor 336 determines whether the BS 102 (see FIG. 1) is receiving an adequate UL signal from the MS 300. Decision block 540 may make this determination using any of the operations described above with respect to decision block 520. If the decision in decision block 540 is "NO," the MS 300 concludes the BS 102 is receiving an inadequate UL signal from the MS and the broadband signal processor 336 advances to decision block 550. Otherwise, if the BS 102 is receiving an adequate UL signal from the MS 300, the decision in decision block 540 is "YES."

In decision block 550, the broadband signal processor 336 determines whether the MS 300 is transmitting at maximum power. If the decision in decision block 540 is "YES," the method 500 terminates. Otherwise, if the decision in decision block 540 is "NO," the method 500 returns to block 530 whereat the transmission output power is increased. By way of a non-limiting example, the output power level may be increased by a predetermined incremental amount (e.g., 0.5 dBm, 1 dBm, 1.5 dBm, 2 dBm, etc.).

If the decision in decision block 540 is "YES," the broadband signal processor 336 performs a method 600. Then, the method 500 terminates.

When the decision in decision block 520 is "YES," the broadband signal processor 336 has determined that the BS 102 is receiving an adequate UL signal. Therefore, the broadband signal processor 336 determines the MS 300 can operate in a broadband mode, communicating with the BS 102 (see FIG. 1) while transmitting at or below the broadband transmit power threshold. In block 570, the MS 300 operates in broadband mode and the broadband signal processor 336 continues to receive new information related to the UL signal (e.g., notifications such as ranging responses) from the BS 102. Then, the method 500 returns to decision block 570 to determine based on the new information whether the UL signal received by the BS 102 (see FIG. 1) is adequate.

FIG. 8 provides a flow diagram illustrating the method 600. For ease of illustration, the method 600 will be described with respect to the MS 300 (see FIG. 5). However, where the implementation of the method 600 in the MS 310 (see FIG. 6) differs from the implementation of the method 600 in the MS 300, those differences are described.

The method 600 implements a low throughput or narrowband mode of operation in the MS 300. Before the method 600 is implemented, the method 500 may be performed to ensure the MS 300 is transmitting an adequate UL signal to the BS 102.

Referring to FIGS. 5 and 8, in first block 610, the broadband signal processor 336 monitors UL traffic (i.e., data to be transmitted by the MS 300 in the UL portion 282 (see FIG. 2) of the frames 280 (see FIG. 2) to the BS 102 (see FIG. 1)).

In decision block 620, the broadband signal processor 336 determines whether data to be transmitted by the MS 300 in the UL portion 282 (see FIG. 2) of the frames 280 (see FIG. 2) is VoIP data. For example, the MS 300 may have a service flow dedicated to voice data and will identify any data sent in this service flow as VoIP data. If the data to be transmitted is VoIP data, the decision in decision block 620 is "YES." If the data to be transmitted is not VoIP data, the decision in decision block 620 is "NO."

If the decision in decision block 620 is "YES," in block 625, the VoIP data is sent to the BS 102. The MS 300 may request that the BS 102 (see FIG. 1) grant the VoIP data a higher priority than other data transmitted. However, those of ordinary skill in the art appreciate that priority is typically defined by the BS 102 and voice calls are almost always granted higher priority than data connections. To send the VoIP data, the broadband signal processor 336 may request that the BS 102 allocate bandwidth to the VoIP data. For example, the broadband signal processor 336 may request that the BS 102 allocate bandwidth in the UL portion 282 (see FIG. 2) of every fourth frame 280 (see FIG. 2) to the VoIP data. As described above, referring to FIG. 2, the VoIP data may be sent in five consecutive slots "SLOT-1," "SLOT-2," "SLOT-3," "SLOT-4," and "SLOT-5" within the UL AMC zone 288, which will use about 200 kHz of bandwidth. Alternatively, PUSC modulation may be used (in the UL PUSC zone 286 or otherwise) and the VoIP data may be sent using the entire channel width or a portion thereof. Returning to FIGS. 5 and 8, after the data is sent in block 625, the method 600 returns to block 610 whereat the broadband signal processor 336 resumes monitoring UL traffic.

If the decision in decision block 620 is "NO," the data to be transmitted is not VoIP data and may require a larger bandwidth or a greater data transmission rate than those typically used for VoIP data. For example, the data may be broadband data, which is typically transmitted over a larger bandwidth and at a greater data transmission rate than those typically used for VoIP data. A data rate threshold value may be selected and used to identify data typically sent at data transmission rates greater than the data rate threshold value (e.g., data sent using "best-effort" protocols). The data rate threshold value may be selected based at least in part on an amount of exposure to RF energy the user will experience when transmitting data below the data rate threshold value at a transmission power greater than the broadband transmit power threshold. For example, the data rate threshold value may be selected to offset the increase in RF energy generated by transmitting at a transmission power level greater than the broadband transmit power threshold by reducing the amount of time during which transmission occurs. Alternatively, the data rate threshold value may be selected based at least in part on the strength of the DL signal received from the BS 102 (see FIG. 1). By way of a non-limiting example, the data rate threshold value may be selected from within a range of about 50 Kbps to about 100 Kbps.

In decision block 630, the broadband signal processor 336 determines whether the MS 300 typically transmits the data at a data transmission rate above the data rate threshold value. If the MS 300 typically transmits the data at a data transmission rate above the data rate threshold value, the decision in decision block 630 is "YES." For example, if the data is broadband data, the decision in decision block 630 is "YES." Otherwise, if the MS 300 typically transmits the data at a data transmission rate equal to or below the data rate threshold value, the decision in decision block 630 is "NO."

If the decision in decision block 630 is "NO," in block 625, the data is sent to the BS 102 (see FIG. 1). On the other hand, if the result of decision block 630 is "YES," the data may be sent to the BS 102 (see FIG. 1) using a data transmission rate below that typically used by the MS 300 to send such data. At decision block 635, the broadband signal processor 336 determines whether the data may be transmitted at a reduced data transmission rate (i.e., a data transmission rate below the data rate threshold value). The result of decision block 635 is "YES" when the data may be transmitted at a reduced data rate and "NO" otherwise. If the decision in decision block 635 is "YES," the method 600 advances to block 640. If the decision in decision block 635 is "NO," the data is not sent and the method 600 returns to block 610 to resume monitoring UL traffic.

In block 640, the data rate is reduced to a reduced data rate below the data rate threshold value. Then, in block 625, the data is sent to the BS 102 (see FIG. 1) at the reduced data rate. After the data is sent in block 625, the method 600 returns to block 610 to resume monitoring UL traffic.

Thus, if the MS 300 wishes to send the outbound data at a transmission power greater than the broadband transmit power threshold, the outbound data must be sent at a data transmission rate below the data rate threshold value. The data rate threshold value may be a configurable parameter the value of which may be set by a network service provider.

The principles of the method 600 may also be applied to other low bandwidth forms of communication. For example, delay tolerant forms of communication, such as, by way of example, email exchanges between the MS 300 and the BS 102 can also be performed using the method 600 or simple variations thereof. Thus, the method 600 is not limited merely to VoIP.

As is apparent to those of ordinary skill in the art, the data transmission rate is a function of the number of subcarriers used (i.e., a transmit bandwidth) and the number of bits transmitted over those carriers in a number of frames sent during a predetermined duration. Therefore, the slots of within the frames may be used in any manner that limits the data transmission rate to below the data rate threshold value.

Thus, the methods 500 and 600 enable the MS 300 to request and receive reduced throughput services (e.g., VoIP) in the extended coverage region 250 using an increased transmission power level, which may be achieved using the pair of power amplifiers 332A and 332B. Similarly, the methods 500 and 600 enable the MS 310 to request and receive reduced throughput services (e.g., VoIP) in the extended coverage region 250 using an increased power level, which may be achieved using the power amplifier 350. Thus, within the extended coverage region 250, the MS 300 and 310 may transmit within a range having a lower limit greater than the broadband transmit power threshold (e.g., 23 dBm) and an upper limit that is determined at least in part by a maximum output level of the power amplifiers 332A and 332B for the MS 300 and the power amplifier 350 for the MS 310.

Within the broadband coverage area 212, the MS 300 and 310 operate in a broadband mode and transmit at a broadband power level that is equal to or less than the broadband transmit power threshold (e.g., 23 dBm). On the other hand, within the extended coverage region 250, the MS 300 and 310 operate in a narrowband or reduced throughput mode and transmit at a power level that is greater than the broadband transmit power threshold (e.g., 23 dBm). The reduced throughput is less than the total throughput available within the broadband coverage area 212. For example, within the broadband coverage area 212, services may be provided at an UL rate up to about 4.68 megabits/second. In contrast, within the extended coverage region 250, services may be provided at a rate of about 50 kbps to about 100 kbps. Thus, the extended coverage region 250 of the BS 102 may be characterized as a reduced throughput coverage area.

Figure 9:
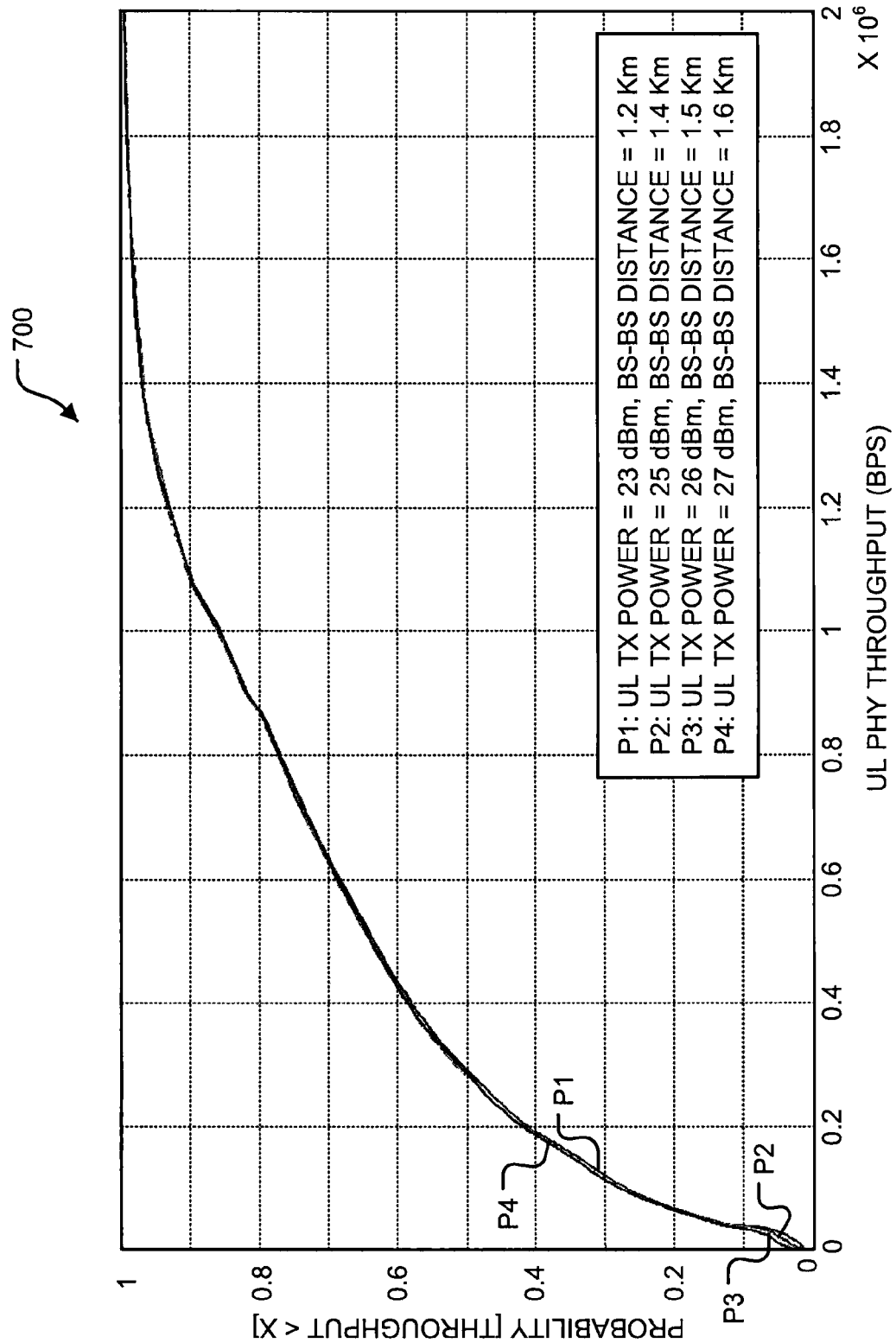
FIG. 9 is a plot of simulation results obtained simulating an implementation of the methods of FIGS. 7 and 8.

FIG. 9 provides a graph 700 of simulation results obtained from a simulation of a network (like the network 200 illustrated in FIG. 1). The graph was obtained using the following simulation parameters: a 19 cell wrap-around (i.e., 19 adjacent cells forming a continuous service area without a boundary; five MS per sector within each cell; 10 MHz bandwidth channels; a conventional WiMAX 1/3/3 reuse scheme (i.e., one base station, three sectors, three channels for a total of 30 MHz); Cost-Hata urban propagation; ITU Pedestrian B channel, shadowing with 8.9 dB STD, 100% loading, no UL Collaborative-multiple-input and multiple-output ("C-MIMO"), Tower Top Low-Noise Amplifier ("TTLNA") enabled, a round-robin scheduler is used to assign sub-channels to each MS, Channel Quality Indication ("CQI") reporting at every five frames, Power Control at every frame, and MAC Automatic Request Transmission ("ARQ")/in-order-delivery enabled.

The graph 700 includes a set of plots of throughput (bps) transmitted by the MS (x-axis) versus the probability that the throughput received by the BS is below a threshold value "x" (y-axis). The plots include a separate plot "P1," "P2," "P3," and "P4" for each of four sets of operating parameters, respectively. The operating parameters for the first plot "P1" correspond to the operating parameters of a conventional WiMAX network. Specifically, the BS are spaced about 1.2 km apart and the MS each transmit at 23 dBm. The operating parameters for the second, third, and fourth plots "P2," "P3," and "P4" space the BS further apart than in the conventional WiMAX network and the MS transmit VoIP data at power levels greater than 23 dBm. Specifically, to create the second plot "P2," the BS were spaced about 1.4 km apart and the MS each transmitted VoIP data at 25 dBm. To create the third plot "P3," the BS were spaced about 1.5 km apart and the MS each transmitted VoIP data at 26 dBm. Finally, to create the fourth plot "P4," the BS were spaced about 1.6 km apart and the MS each transmitted VoIP data at 27 dBm The four plots "P1," "P2," "P3," and "P4" are substantially similar, which indicates that by increasing the transmission power from 23 dBm to about 27 dBm, the total coverage area of a BS 102 (which includes both the broadband coverage area 212 and the extended coverage area 250 of FIG. 1) may be extended by 33% (i.e., from about 0.6 km to about 0.8 km). Further, the total coverage area of a cell may be increased by 25% (i.e., from about 0.6 km to about 0.75 km) by increasing the transmission power from 23 dBm to about 26 dBm. Additionally, the total coverage area of a cell may be increased by 16.7% (i.e., from about 0.6 km to about 0.7 km) by increasing the transmission power from 23 dBm to about 25 dBm.

The simulation demonstrates the methods 500 and 600 allow the MS 300 and 310 (see FIG. 1) to provide broadband services within the broadband coverage area 212 (see FIG. 1) and narrowband or low data throughput services within the extended coverage region 250 (see FIG. 1). This extends the total coverage area of the BS 102 by about 33% for VoIP and other low throughput data applications. Further, not only may the methods 500 and 600 be used to increase the total coverage area 254 of the BS 102, but they may also be used to provide low throughput coverage in areas where either the UL signal or the DL signal is weak.

The approach of the methods 500 and 600 has the advantage that it does not require modification to the standard, base station software, or overall system architecture. Further, the approach is implementable in both PUSC and AMC modes, which leads to better overall sector throughput and less BS dependencies.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A mobile station configured to transmit data at a first data rate and a first transmission power, the first transmission power being less than or equal to a predetermined transmission power limit,
    the mobile station being further configured to transmit data at a second data rate less than the first data rate and a second transmission power greater than the first transmission power, the second data rate not transmitting continuously, the second transmission power being greater than the predetermined transmission power limit, the predetermined transmission power limit limiting Radio Frequency energy generated by the mobile station to an amount that would be generated if the mobile station were transmitting continuously over a predetermined time period at the predetermined transmission power limit.

2. The mobile station of claim 1 for use with a base station, wherein the mobile station is configured to determine communication with the base station is not possible at the first data rate and the first transmission power and after making this determination, to transmit data at the second data rate and the second transmission power.

3. The mobile station of claim 1 comprising a power amplifier configured to selectively amplify a signal comprising the data to be transmitted at the first transmission power and the second transmission power.

4. The mobile station of claim 1 comprising:
    a first power amplifier configured to amplify a signal comprising the data to be transmitted at the first transmission power; and
    a second power amplifier, the first and second power amplifiers being operable together to amplify the signal comprising the data to be transmitted at the second transmission power.

5. The mobile station of claim 1 comprising:
    a first power amplifier configured to amplify a signal comprising the data to be transmitted at the first transmission power; and
    a second power amplifier configured to amplify the signal comprising the data to be transmitted at the second transmission power.

6. A network for use with a predetermined transmission power limit limiting Radio Frequency energy generated by a mobile station to an amount that would be generated if the mobile station had a duty cycle equal to one and was transmitting at the predetermined transmission power limit, the network comprising:
    a plurality of mobile stations each configured to transmit data at a duty cycle less than one, the plurality of mobile stations each being further configured to transmit data at a first power level less than or equal to the predetermined transmission power limit, and a second power level that is greater than both the first power level and the predetermined transmission power limit, the plurality of mobile stations transmitting data at a first data transmission rate when transmitting at the first power level, and the plurality of mobile stations transmitting data at a second data transmission rate when transmitting at the second power level, the second data transmission rate being less than the first data transmission rate; and a plurality of spaced apart base stations each having a first coverage area defined about the base station, and a second coverage area outside the first coverage area and disposed about the first coverage area, the first coverage area being an area in which the base station receives data transmitted by ones of the plurality of mobile stations transmitting at the first power level using the first data transmission rate and the second coverage area being an area in which the base station receives data transmitted by ones of the plurality of mobile stations transmitting at the second power level using the second data transmission rate and does not receive data transmitted by any of the plurality of mobile stations transmitting at the first power level using the first data transmission rate.

7. The network of claim 6, wherein the data transmitted at the second data transmission rate is transmitted over a frequency bandwidth of about 200 KHz and the data transmitted at the first data transmission rate is transmitted over a bandwidth greater than about 200 KHz.

8. The network of claim 6, wherein the data transmitted at the second data transmission rate is Voice over Internet Protocol data.

9. The network of claim 6, wherein the data transmitted at the first data transmission rate is broadband data.

10. The network of claim 6, wherein the first power level is less than or equal to a predetermined transmission power limit determined by a legal authority having authority to determine transmission power limits for the plurality of mobile stations and the second power level is greater than the predetermined transmission power limit.

11. The network of claim 6, wherein data is transmitted by the plurality of mobile stations in a series of consecutive frames and data transmitted by the plurality of mobile stations at the second data transmission rate is transmitted in non-consecutive frames within the series of consecutive frames.

12. The network of claim 11, wherein data transmitted by the plurality of mobile stations at the second data transmission rate is transmitted in every fourth frame of the series of consecutive frames.

13. A network comprising:
a plurality of mobile stations each configured to transmit data at a duty cycle less than one, the plurality of mobile stations each being further configured to transmit data at a first power level and a second power level that is greater than the first power level, the plurality of mobile stations transmitting data at a first data transmission rate when transmitting at the first power level, and the plurality of mobile stations transmitting data at a second data transmission rate when transmitting at the second power level, the second data transmission rate being less than the first data transmission rate, the data transmitted at the second data transmission rate being transmitted in at least one slot of an Adaptive Modulation and Coding zone of an uplink portion of a frame; and a plurality of spaced apart base stations each having a first coverage area defined about the base station, and a second coverage area outside the first coverage area and disposed about the first coverage area, the first coverage area being an area in which the base station receives data transmitted by ones of the plurality of mobile stations transmitting at the first power level using the first data transmission rate and the second coverage area being an area in which the base station receives data transmitted by ones of the plurality of mobile stations transmitting at the second power level using the second data transmission rate and does not receive data transmitted by any of the plurality of mobile stations transmitting at the first power level using the first data transmission rate.

14. The network of claim 13, wherein the data transmitted at the second data transmission rate is Voice over Internet Protocol data.

15. The network of claim 13, wherein the data transmitted at the first data transmission rate is broadband data.

16. The network of claim 13, wherein the first power level is less than or equal to a predetermined transmission power limit determined by a legal authority having authority to determine transmission power limits for the plurality of mobile stations and the second power level is greater than the predetermined transmission power limit.

17. The network of claim 13, wherein data is transmitted by the plurality of mobile stations in a series of consecutive frames and data transmitted by the plurality of mobile stations at the second data transmission rate is transmitted in non-consecutive frames within the series of consecutive frames.

18. The network of claim 17, wherein data transmitted by the plurality of mobile stations at the second data transmission rate is transmitted in every fourth frame of the series of consecutive frames.

19. The network of claim 13, wherein the data transmitted at the second data transmission rate is transmitted over a frequency bandwidth of about 200 KHz and the data transmitted at the first data transmission rate is transmitted over a bandwidth greater than about 200 KHz.

20. A network comprising:
a plurality of mobile stations each configured to transmit data at a duty cycle less than one, the plurality of mobile stations each being further configured to transmit data at a first power level and a second power level that is greater than the first power level, the plurality of mobile stations transmitting data at a first data transmission rate when transmitting at the first power level, and the plurality of mobile stations transmitting data at a second data transmission rate when transmitting at the second power level, the second data transmission rate being less than the first data transmission rate, the data transmitted at the second data transmission rate being transmitted in at least one slot of an Adaptive Modulation and Coding zone of an uplink portion of a frame; and a plurality of spaced apart base stations each having a first coverage area defined about the base station, and a second coverage area outside the first coverage area and disposed about the first coverage area, the first coverage area being an area in which the base station receives data transmitted by ones of the plurality of mobile stations transmitting at the first power level using the first data transmission rate and the second coverage area being an area in which the base station receives data transmitted by ones of the plurality of mobile stations transmitting at the second power level using the second data transmission rate and does not receive data transmitted by any of the plurality of mobile stations transmitting at the first power level using the first data transmission rate.

21. The network of claim 10, wherein the data transmitted at the second data transmission rate is transmitted over a frequency bandwidth of about 200 KHz and the data transmitted at the first data transmission rate is transmitted over a bandwidth greater than about 200 KHz.

22. The network of claim 20, wherein the data transmitted at the second data transmission rate is Voice over Internet Protocol data.

23. The network of claim 20, wherein the data transmitted at the first data transmission rate is broadband data.

24. The network of claim 20, wherein the first power level is less than or equal to a predetermined transmission power limit determined by a legal authority having authority to determine transmission power limits for the plurality of mobile stations and the second power level is greater than the predetermined transmission power limit.

25. The network of claim 20, wherein data is transmitted by the plurality of mobile stations in a series of consecutive frames and data transmitted by the plurality of mobile stations at the second data transmission rate is transmitted in non-consecutive frames within the series of consecutive frames.

26. The network of claim 25, wherein data transmitted by the plurality of mobile stations at the second data transmission rate is transmitted in every fourth frame of the series of consecutive frames.

27. A network comprising:
a plurality of mobile stations each configured to transmit data in a series of the consecutive frames at a duty cycle less than one, the plurality of mobile stations each being further configured to transmit data at a first power level and a second power level that is greater than the first power level, the plurality of mobile stations transmitting data at a first data transmission rate when transmitting at the first power level, and the plurality of mobile stations transmitting data at a second data transmission rate when transmitting at the second power level, the second data transmission rate being less than the first data transmission rate, data transmitted by the plurality of mobile stations at the second data transmission rate being transmitted in non-consecutive frames within the series of consecutive frames; and
a plurality of spaced apart base stations each having a first coverage area defined about the base station, and a second coverage area outside the first coverage area and disposed about the first coverage area, the first coverage area being an area in which the base station receives data transmitted by ones of the plurality of mobile stations transmitting at the first power level using the first data transmission rate and the second coverage area being an area in which the base station receives data transmitted by ones of the plurality of mobile stations transmitting at the second power level using the second data transmission rate and does not receive data transmitted by any of the plurality of mobile stations transmitting at the first power level using the first data transmission rate.

28. The network of claim 27, wherein data transmitted by the plurality of mobile stations at the second data transmission rate is transmitted in every fourth frame of the series of consecutive frames.

29. The network of claim 27, wherein the data transmitted at the second data transmission rate is transmitted over a frequency bandwidth of about 200 KHz and the data transmitted at the first data transmission rate is transmitted over a bandwidth greater than about 200 KHz.

30. The network of claim 27, wherein the data transmitted at the second data transmission rate is Voice over Internet Protocol data.

31. The network of claim 27, wherein the data transmitted at the first data transmission rate is broadband data.

32. The network of claim 27, wherein the first power level is less than or equal to a predetermined transmission power limit determined by a legal authority having authority to determine transmission power limits for the plurality of mobile stations and the second power level is greater than the predetermined transmission power limit.

33. A method implemented in a mobile station configured to transmit at a first power level and a second power level, the first power level being less than or equal to a predetermined transmission power limit and the second power level being greater than the predetermined transmission power limit, when the mobile station is transmitting at one of the first and second power levels, the mobile station generating an amount Radio-Frequency ("RF") energy determined by which of the first and second power levels is used and a duration over a predetermined time period during which the mobile station is transmitting, the predetermined transmission power limit limiting the RF energy generated by the mobile station to an amount that would be generated if the mobile station were transmitting continuously over the predetermined time period at the predetermined transmission power limit, the method comprising:
determining that communication with a base station is not possible with the mobile station transmitting at the first power level;
reducing the data transmission rate of the mobile station when transmitting at the second power level to thereby reduce the RF energy generated by the mobile station to less than or equal to an amount of RF energy that would be generated if the mobile station were transmitting continuously over the predetermined time period at the predetermined transmission power limit; and
transmitting data using the second power level at the reduced data transmission rate.

34. The method of claim 33, wherein determining that communication with the base station is not possible with the mobile station transmitting at the first power level comprises:
transmitting a signal from the mobile station to the base station at the first power level; and
receiving a notification from the base station indicating communication with the base station is not possible with the mobile station transmitting at the first power level.

35. A method implemented in a mobile station configured to transmit at a first power level and a second power level, the first power level being less than or equal to a predetermined transmission power limit and the second power level being greater than the predetermined transmission power limit, when the mobile station is transmitting at one of the first and second power levels, the mobile station generating an amount Radio-Frequency ("RF") energy determined by which of the first and second power levels is used and a duration over a predetermined time period during which the mobile station is transmitting, the predetermined transmission power limit limiting the RF energy generated by the mobile station to an amount that would be generated if the mobile station were transmitting continuously over the predetermined time period at the predetermined transmission power limit, the method comprising:
determining that communication with a base station is not possible with the mobile station transmitting at the first power level;
reducing the data transmission rate of the mobile station when transmitting at the second power level to thereby reduce the RF energy generated by the mobile station to less than or equal to an amount of RF energy that would be generated if the mobile station were transmitting continuously over the predetermined time period at the predetermined transmission power limit;
before transmitting the data, determining whether the data is Voice over Internet Protocol ("VoIP") data;

if the data is not VoIP data, determining whether the data is typically transmitted at a second data transmission rate greater than reduced data transmission rate;

if the data is typically transmitted at a second data transmission rate greater than the reduced data transmission rate, determining whether the data can be transmitted at the reduced data transmission rate; and transmitting the data using the second power level at the reduced data transmission rate only if the data can be transmitted at the reduced data transmission rate.

36. The method of claim 35, wherein the data is typically transmitted at a second data transmission rate greater than the reduced data transmission rate when the data is broadband data.

37. The method of claim 35, wherein determining that communication with the base station is not possible with the mobile station transmitting at the first power level comprises:

transmitting a signal from the mobile station to the base station at the first power level; and receiving a notification from the base station indicating communication with the base station is not possible with the mobile station transmitting at the first power level.

38. A storage medium in a mobile station storing a transmission power threshold value identified by at least one regulatory agency, a data rate threshold value, and instructions executable by a processor, when executed by the processor, the instructions instructing the processor to:

identify data for transmission to a base station at a transmission rate;

determine whether a current transmission power level is insufficient to transmit the data to the base station, the current transmission power level being less than or equal to the transmission power threshold value;

if the current transmission power level is determined to be insufficient:

increase the transmission power level until it is sufficient to transmit the data to the base station, the increased transmission power level being greater than the transmission power threshold value;

determine whether the transmission rate is greater than the data rate threshold value;

if the transmission rate is greater than the data rate threshold value, reduce the transmission rate to less than or equal to the data rate threshold value before transmitting the data; and transmit the data to the base station at the reduced transmission rate using the increased transmission power level.

39. A storage medium in a mobile station storing a transmission power threshold value, a data rate threshold value, and instructions executable by a processor, when executed by the processor, the instructions instructing the processor to:

identify data for transmission to a base station at a transmission rate;

determine whether a current transmission power level is insufficient to transmit the data to the base station, the current transmission power level being less than or equal to the transmission power threshold value;

if the current transmission power level is determined to be insufficient;

increase the transmission power level until it is sufficient to transmit the data to the base station, the increased transmission power level being greater than the transmission power threshold value;

determine whether the transmission rate is greater than the data rate threshold value;

if the transmission rate is greater than the data rate threshold value, reduce the transmission rate to less than or equal to the data rate threshold value before transmitting the data; and transmit the data to the base station at the reduced transmission rate using the increased transmission power level in selected frames of a series of consecutive frames, the selected frames being spaced apart from one another by at least three consecutive frames.

40. A mobile station comprising:

a plurality of power amplifiers each configured to amplify an outbound signal up to a maximum power level for transmission to a base station;

a processor coupled to the plurality of power amplifiers and operable to selectively switch selected ones of the plurality of power amplifiers on and off, a first power amplifier being on and the other power amplifiers being inactive to thereby permit data transmission to the base station at a transmission rate and a first transmission power, the first transmission power being less than or equal to a predetermined transmission power limit identified by at least one regulatory agency, the processor being further configured to determine whether the outbound signal amplified to the maximum power level of the first power amplifier is sufficient to transmit the data to the base station, and if the first transmission power is insufficient to transmit the data to the base station, to switch on a second power amplifier of the plurality of power amplifiers, the first and second power amplifiers together amplifying the outbound signal to a combined transmit power level greater than the maximum power level of the first and second power amplifiers, the processor being further configured to reduce the transmission rate and to transmit the data in the outbound signal to the base station at the reduced transmission rate using the combined transmit power level, wherein transmission of the data at the reduced data rate using the combined transmit power level (a) occurs at a second transmission power that is greater than the predetermined transmission power limit, and (b) has an emitted radiation level that is less than or equal to the emitted radiation level of data transmitted by the mobile station at the first transmission power and the transmission rate.

41. A mobile station comprising:

a plurality of power amplifiers each configured to amplify an outbound signal up to a maximum power level for transmission to a base station;

a processor coupled to the plurality of power amplifiers and operable to selectively switch selected ones of the plurality of power amplifiers on and off, a first power amplifier being on and the other power amplifiers being inactive to thereby permit data transmission to the base station at a transmission rate, the processor being further configured to determine whether the outbound signal amplified to the maximum power level of the first power amplifier is sufficient to transmit the data to the base station, and if the outbound signal amplified to the maximum power level of the first power amplifier is insufficient to transmit the data to the base station to switch on a second power amplifier of the plurality of power amplifiers, the first and second power amplifiers together amplifying the outbound signal to a combined transmit power level greater than the maximum power level of the first and second power amplifiers, the processor being further configured to reduce the transmission rate and to transmit the data in the outbound signal to the base station at the reduced transmission rate and the combined transmit power level, wherein transmission of the data at the reduced data rate and at the combined transmit power level has an emitted radiation level that is less than or equal to the emitted radiation level of data transmitted by the mobile station at the maximum power level of the first power amplifier and the transmission rate, and wherein after the second power amplifier has been switched on and before the data is transmitted, (a) the processor selects a first combined transmit power level greater than the maximum power level of the first power amplifier and less than a sum of the maximum power levels of the first and second power amplifiers;

(b) the processor configures the first and second power amplifiers to amplify the outbound signal to the first combined transmit power level;

(c) the processor determines whether the first combined transmit power level is sufficient to transmit the data in the outbound signal to the base station; and (d) if the first combined transmit power level is insufficient to transmit the data in the outbound signal to the base station, the processor increases the first combined transmit power level, and reconfigures the first and second power amplifiers to amplify the outbound signal to the increased combined transmit power level until the increased combined transmit power level is sufficient to transmit the data in the outbound signal to the base station.

* * * * *